United States Patent
Daugherty, Jr.

(10) Patent No.: US 6,688,482 B1
(45) Date of Patent: Feb. 10, 2004

(54) CONNECTION ASSEMBLY FOR RAILWAY COUPLING DEVICES

(75) Inventor: David W. Daugherty, Jr., Plainfield, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 556 days.

(21) Appl. No.: 09/197,164

(22) Filed: Nov. 20, 1998

(51) Int. Cl.⁷ .................................................. B61G 7/00
(52) U.S. Cl. .................................. 213/75 R; 213/62 R
(58) Field of Search ........................... 213/75 R, 62 R, 213/74, 50; 384/283, 280

(56) References Cited

U.S. PATENT DOCUMENTS

| | | | | |
|---|---|---|---|---|
| 3,843,962 A | * | 10/1974 | Bogue | 308/187 |
| 4,997,295 A | * | 3/1991 | Saitou | 384/492 |
| 5,042,393 A | * | 8/1991 | Kanjo et al. | 105/3 |
| 5,065,679 A | * | 11/1991 | Wallace et al. | 105/3 |
| 5,105,955 A | * | 4/1992 | Hawryszkow et al. | 213/75 R |
| 5,110,221 A | * | 5/1992 | Narkon et al. | 384/203 |
| 5,131,331 A | * | 7/1992 | Lynch, Jr. et al. | 105/3 |
| 5,172,819 A | * | 12/1992 | Daugherety et al. | 213/75 R |
| 5,219,082 A | * | 6/1993 | Daugherty, Jr. et al. | 213/75 R |
| 5,271,679 A | * | 12/1993 | Yamazumi et al. | 384/527 |
| 5,520,295 A | * | 5/1996 | Wiebe | 213/75 R |

* cited by examiner

*Primary Examiner*—S. Joseph Morano
*Assistant Examiner*—Frantz F. Jules
(74) *Attorney, Agent, or Firm*—James Ray & Associates

(57) ABSTRACT

A connection assembly for use in either an articulated coupling arrangement and/or a slackless drawbar arrangement for connecting together adjacently disposed ends of a pair of railway vehicles in a semi-permanent manner is provided. The connection assembly comprises a spherical member and a modified male connection member wherein the male connection member includes an aperture and a portion of the inner surface of the male connection member formed by this aperture forms a part of the inner surface upon which the spherical member rotates against. The inner surface of the modified male connection member includes a portion which is engageable with a retainer member to hold the spherical member within the aperture of the male connection member. This retainer member also completes a substantially spherical inner surface upon which the spherical member can rotate against enabling the male connection member to rotate with respect to a female connection member or a car connection member in the articulated coupling arrangement or slackless drawbar assembly.

31 Claims, 9 Drawing Sheets

CONNECTION ASSEMBLY FOR RAILWAY COUPLING DEVICES

FIELD OF THE INVENTION

The present invention relates, in general, to railway coupling devices and, more particularly, this invention relates to connection assemblies for use in articulated coupling arrangements and slackless drawbar assemblies which are used in the railway industry to couple together the adjacently disposed ends of a pair of railway type freight cars in a substantially semi-permanent fashion.

BACKGROUND OF THE INVENTION

Articulated coupling arrangements and slackless drawbar assemblies have been generally well known in the railroad industry for several years, prior to the development of the present invention, as a means to connect together the adjacently disposed ends of a pair of railway type freight cars in a substantially semi-permanent fashion. In other words, these railway freight cars generally will not require frequent separation during service. Normally they will only be separated during a required repair and/or routinely scheduled maintenance being performed on one or more of them.

These railway cars are particularly adapted for what is most commonly referred to, in the railroad industry, as piggyback service and/or dedicated service wherein the cars may be joined in a semi-permanent fashion. The railroad cars which are joined in such semi-permanent fashion are also commonly referred to in the railroad industry as either a "5-pack" or "10-pack" unit.

These 5-pack or 10-pack units do not require the use of a standard coupler, except between units. The primary reason such standard couplers are not required is because these units are only broken periodically. Normally, this occurs when maintenance of an individual component must be carried out. Obviously, considerable cost-savings are achieved by the use of this semi-permanent coupling arrangement. These cost savings are mainly derived from lower car weight, fewer railway trucks, reduced maintenance and generally lower equipment cost. Such lower equipment cost being achieved by elimination of draft gears and a reduction in the number of trucks required.

With the use of these semi-permanent coupling arrangements and with the higher loads presently being carried by modern railway trains, it is of the utmost importance that a close-buttoned relationship be maintained between the numerous coupler draft components. Such a close-buttoned relationship is required in order to reduce the detrimental effects of the impact forces which are encountered by a car under buff conditions of train operations.

One prior type of articulated coupling device used for the purpose of connecting adjacent ends of a pair of railway cars, in a semi-permanent manner, is taught in U.S. Pat. No. 5,172,819, the teachings of such patent hereby being incorporated into the present application by reference thereto.

This particular articulated coupling device includes a male connection member secured to one end of a first railway car body and a female connection member secured to an adjacent end of a second railway car body. The male connection member includes an aperture therein. A bearing assembly, including a substantially spherical member, is positioned within this aperture for joining such male connection member with the female connection member.

A race assembly, formed by at least two members, is provided within the aperture and is positioned around a predetermined portion of the substantially spherical member. The race assembly enables requisite movement of the male connection member in relation to the female connection member in each of a vertical direction and a horizontal direction over a predetermined range of angles measured from each of a centerline of the spherical member disposed in a vertical direction and a longitudinal axis of the articulated coupling arrangement disposed in a horizontal direction. A securing means is provided which is engageable with each of the race assembly and the male connection member for securing the race assembly and the spherical member to the male connection member.

One generally well known slackless type drawbar assembly using a ball and race type connection includes the following elements: a car connection member, or female connection member, engageable within the center sill portion of a railway vehicle, a spherical member securable within the car connection member, a male connection member having a curved butt end and an aperture which is disposed around the spherical member secured within the car connection member, a two piece race assembly secured within the aperture of the male connection member and disposed between the spherical member and such aperture and a drawbar connected to such male connection member.

A disadvantage of the articulated coupling arrangements and slackless drawbar assemblies discussed above is the provision of at least two separate members to form the race assembly and the care which must be taken to secure these two separate members within the aperture of the male connection member around a predetermined portion of the spherical member. These factors add additional materials cost, assembling time and labor to the manufacture of the articulated coupling arrangement and/or slackless drawbar assembly.

SUMMARY OF THE INVENTION

An object of the present invention is to provide a connection assembly for use in an articulated coupling arrangement and/or a slackless drawbar assembly to connect together the adjacently disposed ends of a pair of railway type freight cars in a substantially semi-permanent fashion.

Another object of the present invention is to provide a male connection assembly for use in an articulated coupling arrangement and/or a slackless drawbar assembly to connect together the adjacently disposed ends of a pair of railway type freight cars in a substantially semi-permanent fashion.

Still another object of the present invention is to provide a retainer member for use in a connection assembly in an articulated coupling arrangement and/or a slackless drawbar assembly to connect together the adjacently disposed ends of a pair of railway type freight cars in a substantially semi-permanent fashion.

A further object of the present invention is to replace the two piece race assembly with a single piece retainer member which fits into a slotted portion formed by the male connection member so as to form a substantially spherical inner surface upon which the spherical member can rotate against.

Yet another object of the present invention is to provide a connection assembly that is easily assembled thus providing a significant reduction in time and labor.

Still yet another object of the present invention is to provide a connection assembly that requires fewer component parts thereby providing a significant reduction in manufacturing cost.

Briefly, and in accordance with the foregoing objects, the instant invention comprises a connection assembly for use in an articulated type coupling arrangement and/or a slackless drawbar type assembly utilized in connecting together, in a substantially semi-permanent manner, adjacently disposed ends of a pair of railway cars. The connection assembly includes a substantially spherical member having a predetermined diameter, a male connection member having at least one end which includes an aperture formed therethrough so as to form an inner surface within this male connection member, and a retainer member engageable with at least a portion of the inner surface within the male connection member forming a substantially spherical inner surface including at least a portion of the inner surface of the male connection member and at least a portion of the retainer member. This substantially spherical inner surface formed by at least a portion of the male member and at least a portion of the retainer member is positioned around a predetermined portion of the spherical member in a manner so as to enable movement of the male connection member in relation to a female connection member in both a vertical direction and a horizontal direction over a predetermined range of angles. A securing means is provided for securing the retainer member with at least a portion of the inner surface of the male connection member and a joining means is provided for joining the spherical member to the female connection member so as to connect adjacent ends of a pair of railway vehicles.

Although a number of objects and advantages of the present invention have been described in some detail above, various additional objects and advantages of the connection assembly according to the present invention will become more readily apparent to those persons who are skilled in the railway coupling art from the following more detailed description of the invention, particularly, when such detailed description of the invention is taken in conjunction with both the attached drawing figures and with the appended claims.

DETAILED DESCRIPTION OF THE INVENTION

Figure 1:
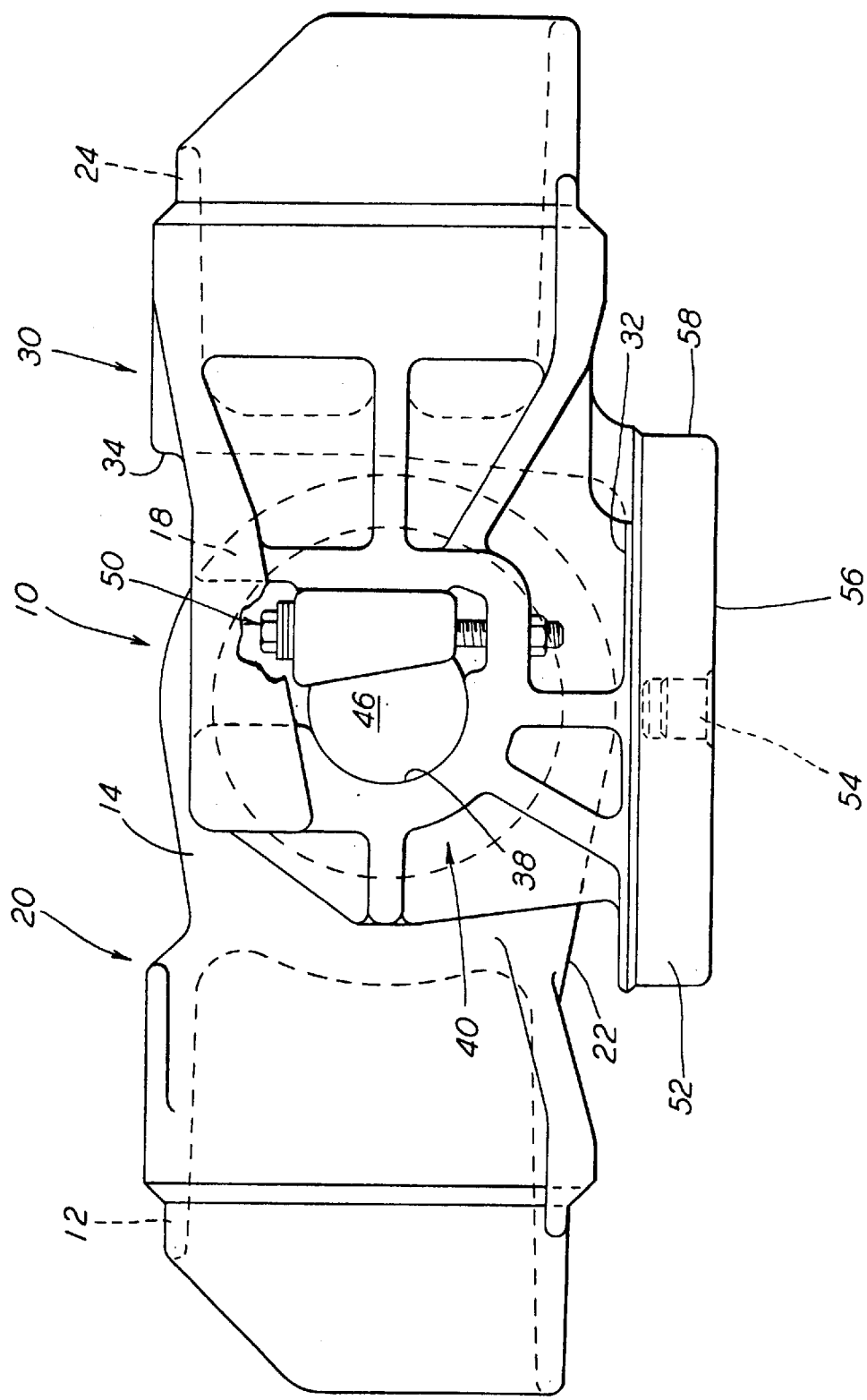
FIG. 1 is a side elevation view, partially in cross-section, which illustrates one presently preferred embodiment of a connection assembly constructed according to the present invention for use in an articulated type coupling arrangement.

Prior to proceeding to the more detailed description of the various embodiments of the instant invention, it should be pointed out that, for the sake of clarity, identical components which have identical functions have been identified with identical reference numerals throughout the several views that have been illustrated in the drawings.

Figure 2:
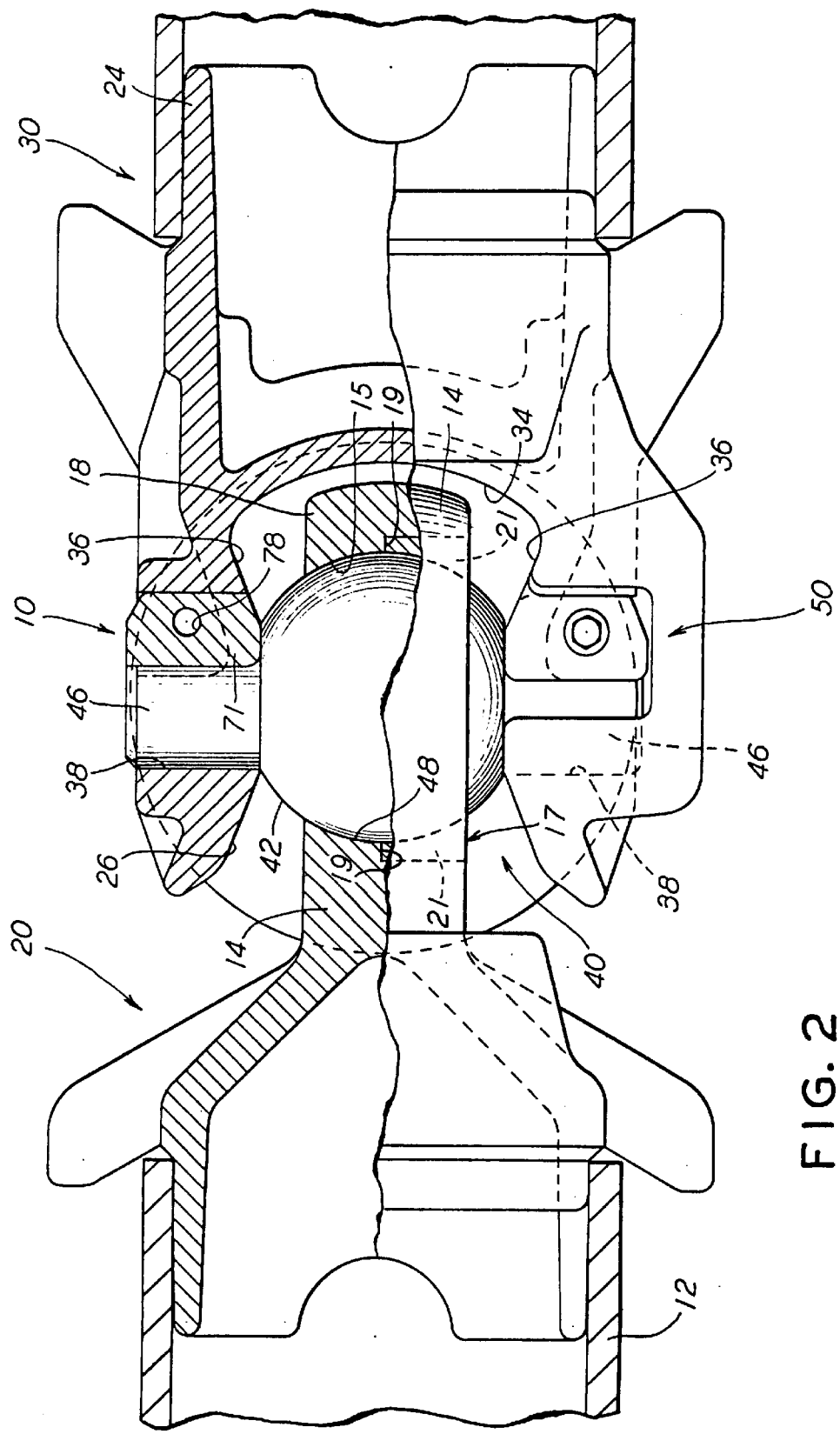
FIG. 2 is a top view, partially in cross-section, of the connection assembly illustrated in FIG. 1.

Now reference is made, more particularly, to drawing FIGS. 1–2 in which there is illustrated one presently preferred embodiment of a connection assembly for use in an articulated type coupling arrangement, generally designated 10, that is constructed in accordance with the principals of the present invention. This articulated coupling arrangement 10 can be retrofitted to existing railway cars, if desired, and is capable of connecting together, in a substantially semi-permanent manner, at least one predetermined end of a first railway car (not shown) to an adjacent predetermined end of a second railway car (not shown).

Such articulated coupling arrangement 10 generally includes a male connection member, generally designated 20, a female connection member, generally designated 30, a connection assembly, constructed according to the present invention and generally designated 40, and a means, generally designated 50 for joining the connection assembly 40 to such articulated type coupling arrangement 10 in a semi-permanent fashion.

The male connection member 20 is adapted at a first end 12 thereof in a manner that will enable such male connection member 20 to be engaged with and connected to one predetermined end of a center sill member (not shown) disposed substantially along a longitudinal centerline of one of such first railway car and such second railway car.

Prior to being secured in place, preferably by welding, the first end 12 of the male connection member 20 is positioned within the center sill portion for a predetermined distance. Usually this predetermined distance will be about 6 to 10 inches and about 8 inches being preferred and typical. Because the first end 12 of the male connection member 20 must fit within the center sill portion of the railway car, its outer dimensions are substantially controlled by the inner dimensions of such center sill portion.

The second end 14 of the male connection member 20 is generally an elongated rectangular-shaped element. The outermost end 18 of the second end 14 of the male connection member 20, preferably, has a convex shape in a plane which extends in both a vertical direction and a horizontal direction.

In addition, the bottom wall portion 22 of the second end 14 of the male connection member 20 is tapered upwardly starting from a predetermined position and extending toward such first end 12. Such tapered portion has a taper of at least about 10 degrees. The purpose of this tapered portion of the bottom wall 22 of the male connection member 20 is to allow flexing in a horizontal plane when the cars are moving over a hilly terrain.

Disposed within the second end 14 of the male connection member 20 is an aperture 16. At least a portion of aperture 16 forms a substantially spherical inner surface 15 within the male connection member. The aperture 16 includes a predetermined size and a predetermined shape. This aperture 16 is formed through a predetermined portion of the second end 14 of such male connection member 20. This aperture 16 has a longitudinal axis that is disposed transverse to a longitudinal axis of the male connection member 20 and lies in a substantially horizontal plane.

Figure 8:
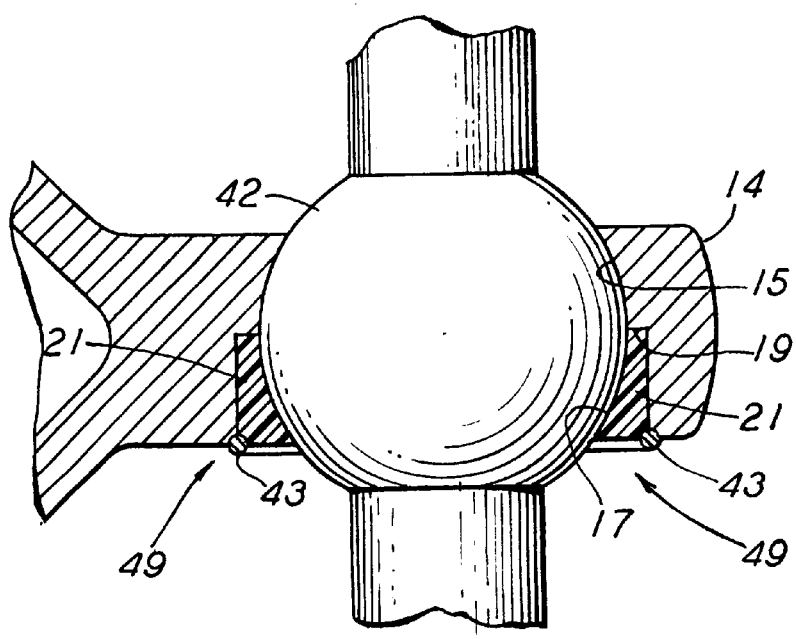
FIG. 8 is a partial view of the connection assembly of the present invention which may utilized in either an articulated type coupling arrangement or a slackless type drawbar assembly.

At least a portion of the inner surface of the male connection member is removed from the plane formed by the substantially spherical inner surface 15 so as to provide sufficient space such that the spherical member may be positioned within this aperture and at least a portion of the outer surface of the spherical member engages the substantially spherical inner surface 15 of the male connection member. For example, a slotted portion 17 having a ledge 19 is formed along the inner surface 15 of the male connection member 14. This slotted portion 17 can extend longitudinally along the inner surface of the male connection member such that a continuously extending single ledge 19 is provided as shown in FIG. 8. This slotted portion 17 can be formed by any well known technique such as machining, grinding, casting and the like.

The female connection member 30 includes a first end 24 which is configured in a manner that will enable such female connection member 30 to be engaged with and connected to an adjacent predetermined end of a center sill member (not shown) disposed substantially along a longitudinal centerline of an opposite one of such first railway car and such second railway car (not shown).

A cavity 26 is formed in a second end of the female connection member 30. This cavity 26 receives therein at least a portion of each of the second end 14 of the male connection member 20 and such aperture 16 formed through the predetermined portion of such second end 14 of the male connection member 20. This cavity 26 is formed by a substantially horizontally-disposed bottom wall portion 32, a substantially vertically-disposed back wall portion 34 connected along a bottom edge thereof to a rear edge of such bottom wall portion 32 and a pair of vertically-disposed side wall portions 36 connected along a bottom edge thereof to the bottom wall portion 32 and along a rear edge thereof to such back wall portion 34.

A vertically-disposed plane which intersects a geometric centerline of each respective one of such pair of side wall portions 36 being substantially parallel to each other. An inner surface of each of such bottom wall portion 32 and such rear wall portion 34 and such pair of side wall portions 36 define a predetermined size and a predetermined shape of the cavity 26 which is open adjacent a top and front surface thereof. An opening 38 is formed through a predetermined portion of each one of the pair of side wall portions 36.

The articulated coupling arrangement 10 includes a connection assembly 40. Such connection assembly 40 includes a substantially spherical member 42. At least a predetermined portion of such spherical member 42 is positioned within such aperture 16 formed through the predetermined portion of the second end 14 of the male connection member 20. Such spherical member 42 has a predetermined diameter. In the presently preferred embodiment, at least a portion of the substantially spherical inner surface 15 of such male connection member 14 is positioned adjacent to a predetermined first portion of the spherical member 42.

A retainer member 21 having a substantially spherical shaped inner surface is engageable with at least a portion of the inner surface of such male connection member 20. This retainer member can be any shape as needed in order to fit in the space provided within the aperture of the male connection member so as to be engaged with and/or mate with the inner surface of the male connection member so as to form a substantially spherical inner surface upon which the spherical member rotates against. For example, depending upon the size of the space provided, this retainer member can have a substantially rectangular shape having at least one arcuate side engageable with the spherical member. Another example would be for the retainer member to have a flat top surface which butts up against a ledge 19 formed by providing a slotted portion 17 in the inner surface of the male connection member to form the substantially spherical inner surface including at least a portion of the inner surface 15 of such male connection member 14 and the retainer member 21. At least a portion of the retainer member is positioned around a predetermined second portion of the spherical member 42. The substantially spherical inner surface formed by t least a portion of the inner surface 15 of the male connection member and at least a portion of the retainer member 21 provides a surface which enables movement of such male connection member 20 in relation to such female connection member 30 in both a vertical direction and a horizontal direction over a predetermined range of angles measured from a centerline of the spherical member 42 disposed in a vertical direction and from a longitudinal axis of such articulated coupling arrangement disposed in a horizontal direction.

As shown in FIG. 8, the retainer member 21 is formed from a one piece circular member and which is sufficiently inserted into the slotted portion 17 of the male connection member so as to form a smooth surface upon which the spherical member can rotate against. The retainer member 21 can be formed from any well known material which has sufficient strength to withstand the forces generated by the rotation of the spherical member thereagainst. For example, the retainer member can be formed from a metal which is cast, ground, or molded substantially to size.

Alternatively, the retainer member 21 can be formed from a polymeric and/or composite material. For example, the retainer member 21 can be formed by filament winding a resin impregnated reinforcing material, such as epoxy impregnated glass fiber, about a Teflon®/Dacron® yarn mesh base, curing the resin in the fibers, and machining the retainer member 21 to the desired size. Teflon®, also known as PTFE and/or polytetrafluoroethylene, and Dacron®, also known as polyester, are registered trademarks of E.I. Dupont De Nemours. The Dacron® yarns enable the resin impregnated fibers to bond to the desired shape while the Teflon® yarns provide a nonstick surface. This type of material has especially good strength and lubricating abilities which allows for unrestricted movement of the spherical member thereagainst.

Other polymeric materials, well known in the art, may be used to form the retainer member 21 as long as such materials provide sufficient strength and lubrication to such retainer member 21.

Figure 10:
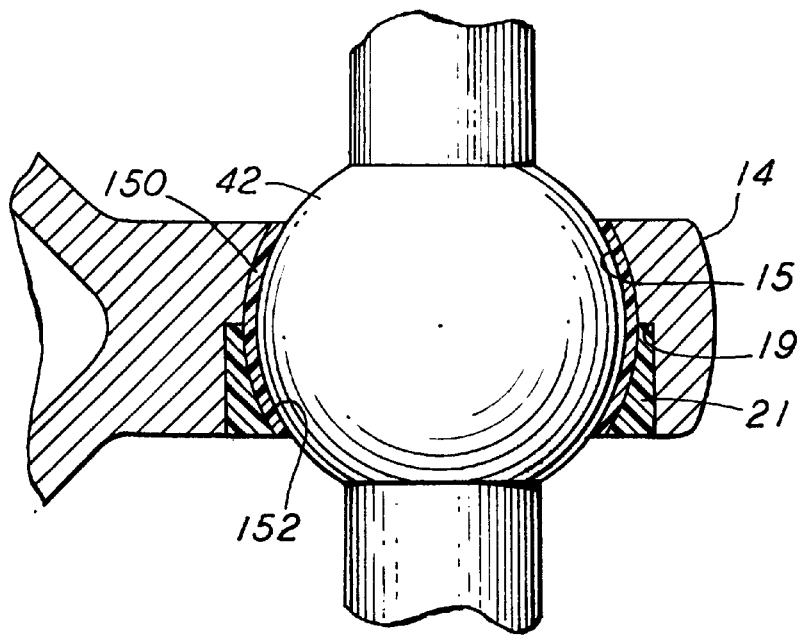
FIG. 10 is a partial view of the connection assembly of the present invention including a one piece liner member which may be utilized in either an articulated type coupling arrangement or a slackless type drawbar assembly.

FIG. 10 shows an alternative embodiment to the use of the substantially spherical inner surface formed by the inner surface of the male connection member and the retainer member as the surface upon which the spherical member 21 rotates against. This embodiment illustrates the use of a one piece liner member 150 positioned between the spherical member and the substantially spherical inner surface formed by the male connection member and the retainer member 21.

This one piece liner member 150 has a substantially spherical inner surface 152 upon which the spherical member 42 rotates against enabling movement of such male connection member 20 in relation to such female connection member 30 in both a vertical direction and a horizontal direction over a predetermined range of angles. As discussed above with respect to the preferred retainer member 21, this one piece liner member 150 can be formed from any well known material which has sufficient strength to withstand the forces generated by in-track service and the rotation of the spherical member 42 thereagainst. For example, the one piece liner member 150 can be formed from a metal which is cast, ground, or molded to size.

Alternatively, the one piece liner member 150 can be formed from a polymeric and/or composite material. An example of the materials and process of forming a polymeric and/or composite retainer member 21 has been discussed in detail above and are likewise equally applicable to the formation of this one piece liner member 150.

Figure 9A:
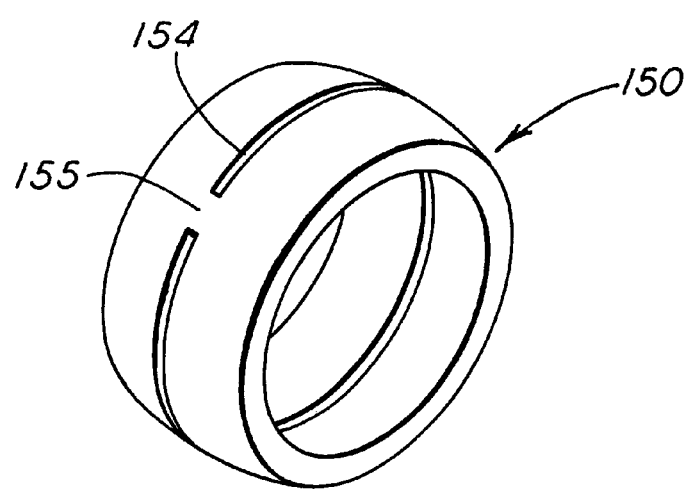
FIGS. 9A and 9B show alternative embodiments of the one piece liner member which may be inserted between the spherical member and the spherical surface formed by the inner surface of the male connection member and the retainer member.
Figure 9B:
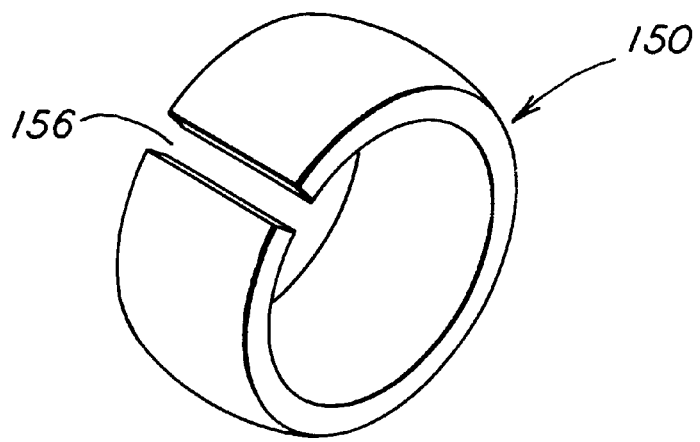

The one piece liner member 150 can be split partially along its circular length as shown at 154 in FIG. 9A. A portion 155 of the liner member 150 will remain unsplit. Alternatively, the one piece liner member 150 can be split in a horizontal direction across its width, as shown at 156 in FIG. 9B. The one piece liner member 150 can be secured within the aperture of the male connection member/retainer member by any well known means such as adhesive, brazing, welding, fusing, mechanical means, and the like.

An alternative technique for possibly securing a thermoset resin impregnated polymeric and/or composite liner material within the aperture would be to partially cure the thermoset resin in the liner material during production. Then, during assembly of the liner member within the connection assembly, position the liner member 150 within the aperture and fully cure the resin such that this resin bonds the liner within the aperture.

Also, there is preferably a securing means 43 provided for securing the retainer member 21 within the aperture of such male connection member 20. This securing means 43 can be a mechanical securing means such as in the form of a circular ring which is secured along the interface surface area 49 of the male connection member 20 and the retainer member 21.

Alternatively an adhesive material, brazing material, or any type of well known securing material may be used to secure the retainer member within the aperture of the male connection member. For example, this securing material may be inserted between the retainer member and the inner surface of the slotted portion for securing the retainer member 21 within the slotted portion 17. An additional option would be for the retainer member 21 to be welded or fused within the aperture and/or slotted portion 17 of the male connection member 20.

A pair of shaft members 46 extend outwardly a predetermined length from axially-opposed surfaces of such spherical member 42. One of such pair of shaft members 46 being engaged in a respective one of such openings 38 formed through such each one of such pair of side wall portions 36 of such cavity 26 formed in the second end of such female connection member 30. At least a portion of each of such pair of shaft members 46 having a substantially identical configuration as at least a portion of such predetermined configuration of such opening 38 formed through such side wall portions 36.

A joining means, generally designated 50, is engageable with at least one of such pair of shaft members 46 and a portion of such opening 38 formed through such side wall portions 36 for securing the connection assembly 40 to such female connection member 30 and thereby securing the male connection member 20 to such female connection member 30 to form the articulated type coupling arrangement 10 of the instant invention.

In one form of the invention, the substantially spherical inner surface formed by the male connection member 20 having the retainer member 21 positioned therein will have a substantially identical radius as that of the spherical member 42. Alternatively, the substantially spherical inner surface formed by the one piece liner member 150 will have a substantially identical radius as that of the spherical member 42.

In another embodiment of the invention, the substantially spherical inner surface formed by the male connection member 20 having the retainer member 21 positioned therein or the substantially spherical inner surface formed by the one piece liner member 150 will be slightly larger than the radius of the spherical member 42. In this case the articulated coupling arrangement 10 further includes a lubricating liner 48 disposed adjacent the outer surface of the spherical member 42.

According to the present invention, the bottom wall portion 32 of the cavity 26 formed in the second end of the female connection member 30 further includes a center plate member 52 which matingly engages a center bowl (not shown) of a bolster portion (not shown) of a railway car truck (not shown). Such center plate member 52 includes a vertically disposed hole 54 adjacent a bottom surface 56 thereof. Such hole 54 is located substantially in the center of the center plate member 52.

Additionally, the articulated coupling arrangement 10 further includes a vertically disposed pin member (not shown) which is engageable in the hole 54 in the center plate member 52 and a vertically disposed hole (not shown) in the center bowl of the bolster.

It is presently preferred that the bottom surface 56 of the center plate member 52, which is a bearing surface, be hardened to at least about 375 Brinell for a depth of at least about one-eighth inch.

Further, the center plate member 52 is substantially round, and a vertically disposed side 58 thereof is hardened to a Brinell hardness of at least about 300 for a distance of at least about one inch up from the bottom surface 56 and to a depth of about one-eighth inch.

In the presently preferred embodiment of this invention, the second end 14 of the male connection member 20 has a predetermined configuration adjacent an outermost end 18 thereof. This predetermined configuration of the outermost end 18 of the second end 14 of the male connection member 20 is a substantially convex shape in each of a vertically disposed plane and a horizontally disposed plane.

In addition, it is preferred that the vertically disposed back wall portion 34 of the cavity 26 formed in the second end of the female connection member 30 has a predetermined configuration. This predetermined configuration of the vertically disposed back wall portion 34 of the cavity 26 is a substantially concave shape in at least one of a vertical plane and a horizontal plane.

It is also preferred that the spherical member 42 and the pair of shaft members 46, forming a portion of the connection member 40 of the articulated coupling arrangement 10, be formed as a single piece.

In the preferred embodiment of this invention, the pair of vertically disposed side wall portions 36 include a tapered portion adjacent the front surface of the cavity 26 and adjacent the vertically disposed back wall portion 34 of the cavity 26 to enable the second end 14 of the male connection member 20 to rotate about the spherical member 42 in a horizontal direction.

Finally, the presently preferred predetermined configuration of the opening 38 formed through each pair of such vertically disposed side wall portions 36 includes a generally round portion engageable with a portion of a respective one of such pair of shaft members 46.

Figure 3:
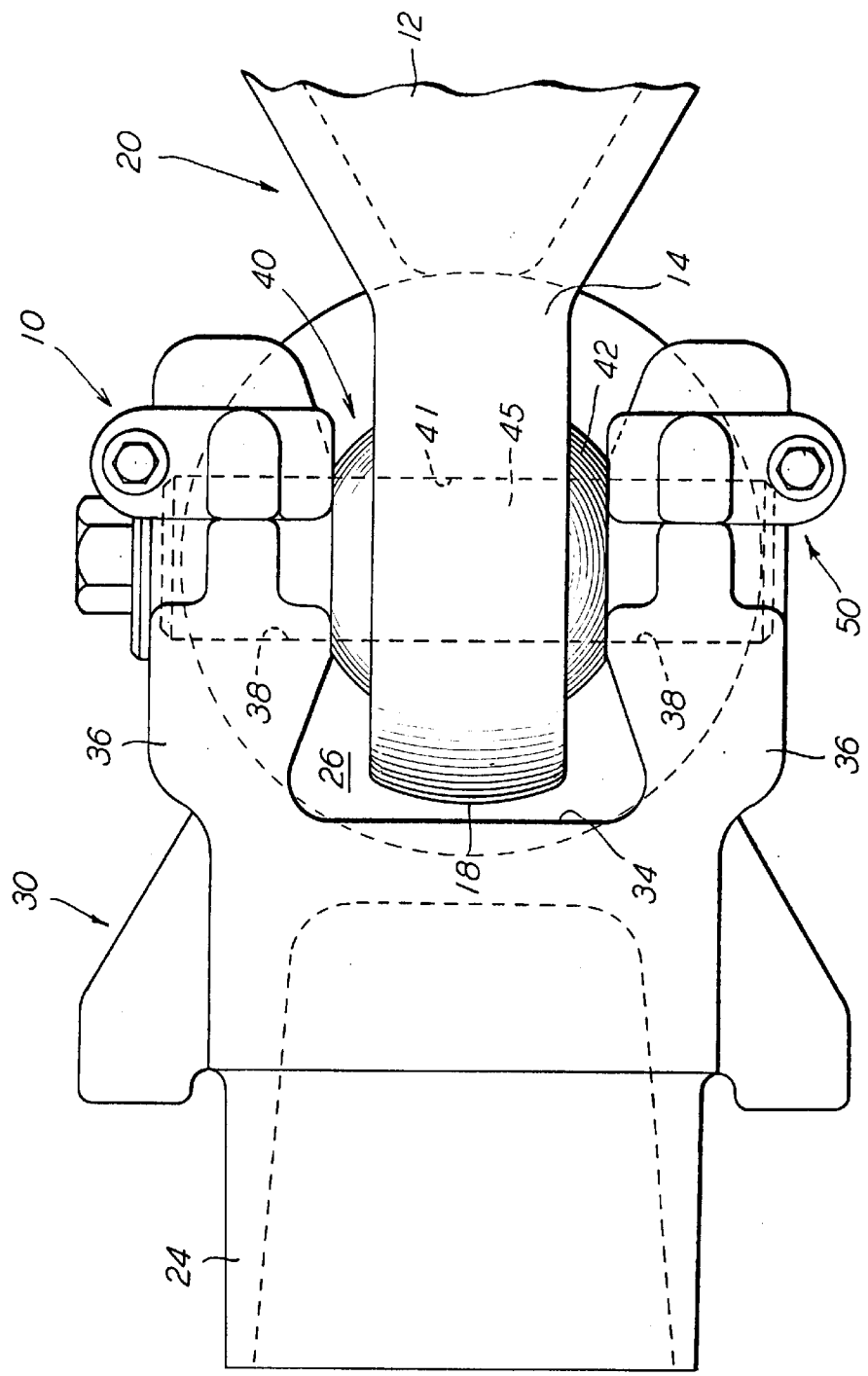
FIG. 3 is a top view which illustrates an alternative embodiment of a connection assembly for use in an articulated type coupling arrangement.
Figure 4:
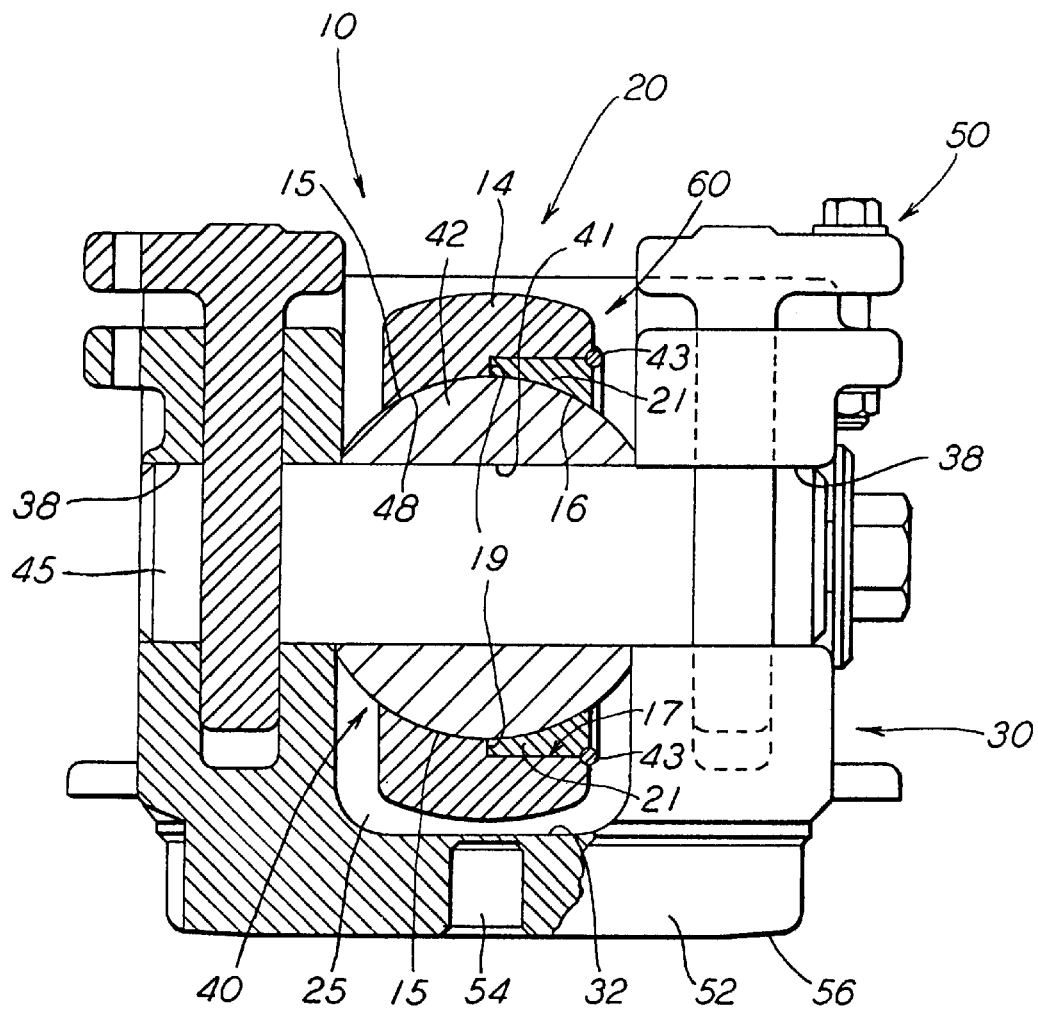
FIG. 4 is a cross-sectional view of the bearing assembly illustrated in FIG. 3.

In the alternative embodiment of the connection assembly 40 illustrated in FIGS. 3 and 4, the connection assembly 40 includes a substantially spherical member 42. At least a predetermined portion of such spherical member 42 is positioned within such aperture 16 formed through the predetermined portion of the second end 14 of the male connection member 20. The spherical member 42 has a predetermined diameter.

A bore 41 is formed through the spherical member 42. Such bore 41 has each of a predetermined size and a predetermined shape. A longitudinal axis of such bore 41 lies in a substantially horizontal plane.

A pin member 45, which has a horizontally disposed axis, is provided. The pin member 45 extends through the bore 41 in the spherical member 42 for a predetermined length on each side of axially opposed surfaces of the spherical member 42. A portion of the pin member 45 is disposed within the bore 41 of the spherical member 42 and has a substantially identical size and a substantially identical shape as the predetermined size and predetermined shape of the bore 41 thereby enabling a press-fit. At least a portion of the predetermined length on each side of the spherical member 42, which engages at least a portion of the opening 38 formed through the pair of side wall portions 36, has a substantially identical size and identical configuration as the predetermined configuration of the opening 38.

In a presently preferred embodiment, the inner surface 15 of the male connection member 20 is formed with a slotted portion 17 having at least one ledge 19 for matingly engaging at least one retainer member 21 so as to form a substantially spherical inner surface for surrounding at least a portion of the spherical member 42. Placement of the spherical member 42 within this substantially spherical inner surface enables the movement of the male connection member 20 in relation to the female connection member 30 in both a vertical direction and a horizontal direction over a predetermined range.

While a number of embodiments of the connection assembly for use in an articulated type coupling arrangement, constructed according to the present invention, have been described in detail above, it should be obvious to persons skilled in the railway coupling art that the connection assembly of the present invention can be effectively used in slackless type drawbar assemblies as well.

Figure 5:
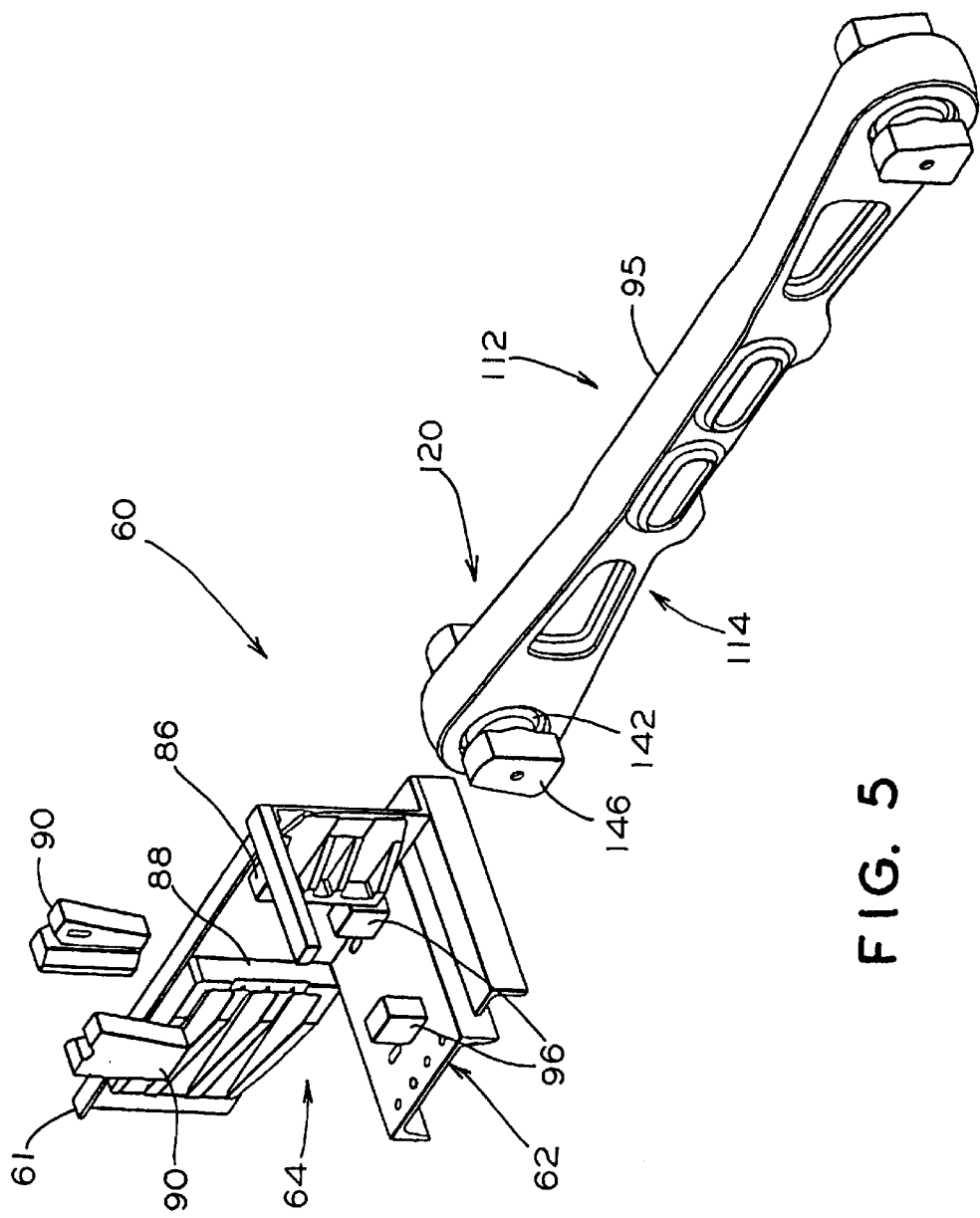
FIG. 5 is an expanded view of a slackless type drawbar assembly using the connection assembly of the present invention prior to insertion of the male connection member of the drawbar assembly into the female connection member.
Figure 6:
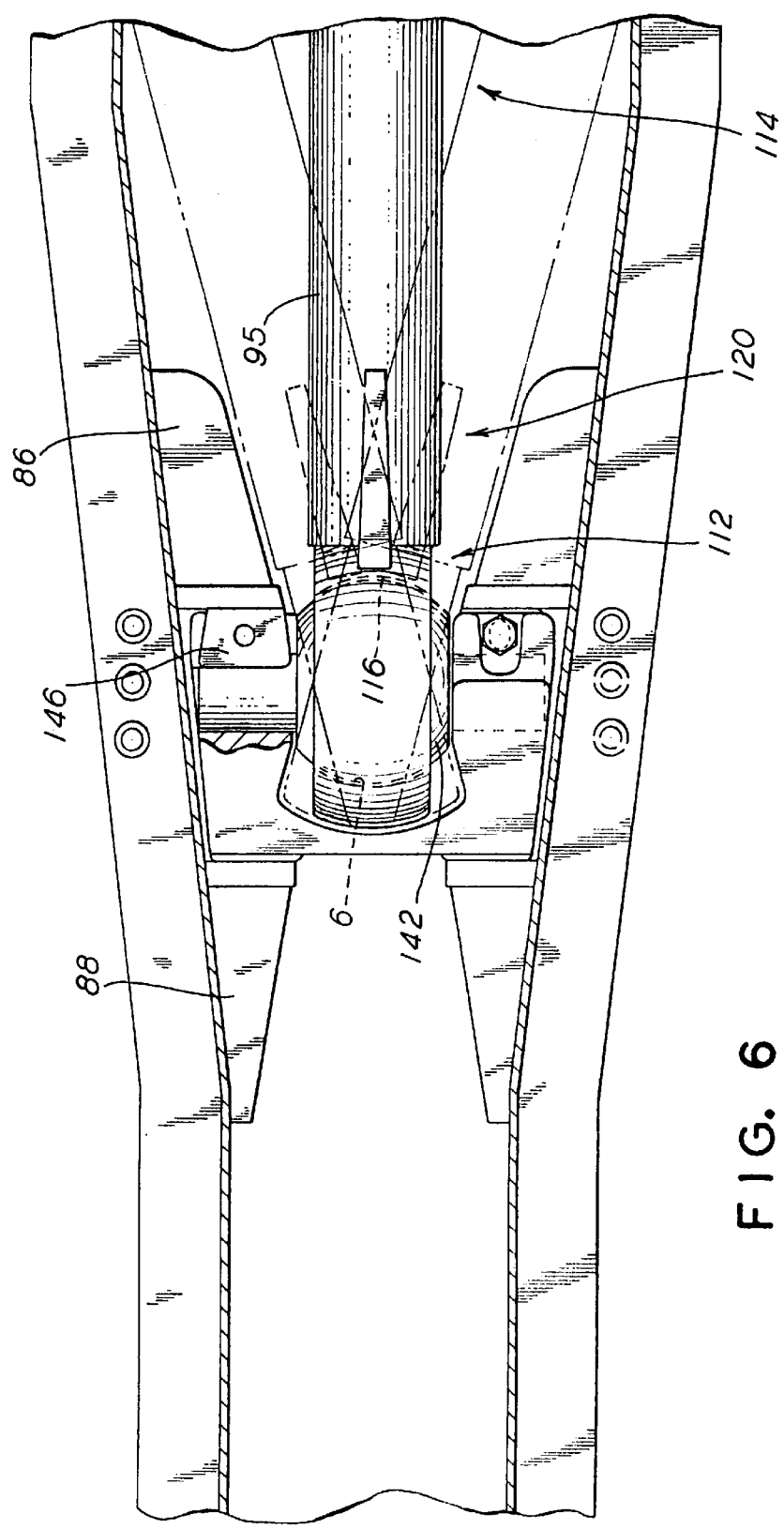
FIG. 6 is a top view of the connection assembly of a slackless type drawbar assembly wherein the male connection member of the drawbar assembly has been joined with the female connection member.
Figure 7:
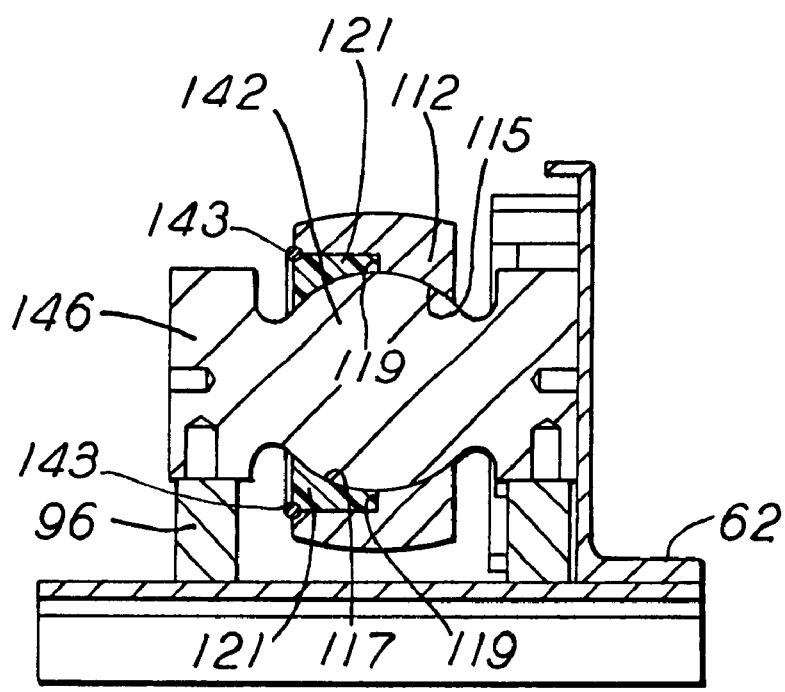
FIG. 7 is an enlarged cross-sectional view of the connection assembly of a slackless type drawbar assembly.

Reference is now made, more particularly, to FIGS. 5–7. Illustrated therein are the essential components of a slackless type drawbar assembly, generally designated as 60, used to connect together in a substantially semi-permanent fashion adjacently disposed ends of a pair of railway cars (not shown).

This slackless drawbar assembly 60 includes a car connection member or female connection member, generally designated 64, which is engageable via a carrier plate 62 in one end of a center sill member 61. The carrier plate 62 can be secured with such center sill member 61 by any well known means, such as, for example with a bolt and lock nut assembly. The center sill member 61 is secured to a bottom portion of a car body member (not shown) of a railway car (not shown)

The car connection member 64, generally includes a pair of front and a pair of rear draft stops 86,88, locking wedges 90 a pair of shaft members 146 and shaft member supports 96. The locking wedges 90 may be separate members or may be a single machined or cast piece wherein the locking wedges are connected by a bridge member (not shown).

Filler blocks (not shown) may be included between the rear draft stops 88 and the locking wedges 90 to retrofit some of the longer, older drawbar systems to systems capable of using the connection assembly of the present invention. A spherical shaped member 142 is secured to the shaft members 146 by any well known means. These shaft members 146 are securable with the car connection member 64 through the shaft member supports 96.

A male connection member, generally designated as 120, having a first end, generally designated 112, and a second end, generally designated 114, is provided. An aperture 116, having a predetermined size and a predetermined shape, is formed through a predetermined portion of the second end 114 of the male connection member 120 to form a substantially spherical inner surface 115 within the male connection member. This aperture 116 has a longitudinal axis that is disposed transverse to a longitudinal axis of the male connection member 120 and lies in a substantially horizontal plane. In one embodiment, a slotted portion 117 having a ledge 119 is formed along the inner surface 115 of the male connection member 114. This slotted portion 117 extends longitudinally along the inner surface of the male connection member such that a continuously extending single ledge 119 is provided as shown in FIGS. 8 and 10. This aperture 116 forms an inner surface 115 within such male connection member which is capable of being disposed around at least a portion of the spherical member 142.

The male connection member 120 includes a means 95 attached thereto for connecting together an end of a second railway car (not shown) with an adjacently disposed end of the first railway car (not shown). This means 95 can be in the form of a drawbar assembly including a second male connection member, similar to that described above, which is capable of being fitted with a corresponding car connection member or female connection member, also similar to that described above, on the second railway car or a rotary type connection assembly (not shown).

The slackless type drawbar assembly 60 includes a connection assembly 140, which is similar to the articulated type coupling arrangement 10, as shown in FIGS. 1–4, and discussed in detail above. Such connection assembly 140 includes a substantially spherical member 142. At least a predetermined portion of such spherical member 142 is positioned within such aperture 116 formed through the predetermined portion of the second end 114 of the male connection member 120. Such spherical member 142 has a predetermined diameter. In the presently preferred embodiment, at least a portion of the substantially spherical inner surface 115 of such male connection member 114 is positioned adjacent a predetermined portion of the spherical member 142.

A retainer member 121 having a substantially spherical shape is engageable within the slotted portion 117 of such male connection member 120. An end of this retainer member 121 butts up against the ledge 119 of the slotted portion 117 to form a substantially spherical inner surface including at least a portion of such inner surface 115 of such male connection member 114 and the retainer member 121. This substantially spherical inner surface is positioned around a predetermined portion of such spherical member 142 and provides a surface which enables movement of such male connection member 120 in relation to such car connection member 64 in both a vertical direction and a horizontal direction over a predetermined range of angles measured from a centerline of the spherical member 142 disposed in a vertical direction and from a longitudinal axis of such articulated coupling arrangement disposed in a horizontal direction.

The retainer member 121 is formed as a single piece from any well known material as discussed in detail above. Additionally, any well known and/or previously mentioned securing means 143 may be used for securing the retainer member 121 within the slotted portion 117 of such male connection member 120. Also, note that the inner surface of the male connection member is not limited to surfaces having a "slotted" portion removed therefrom and can include other shaped surfaces as discussed in detail above.

While a number of embodiments of the connection assembly for use in an articulated type coupling arrangement and/or a slackless drawbar type assembly, constructed according to the present invention, have been described in detail above, it should be obvious to persons skilled in the railway coupling art that various other modifications and adaptions of such articulated coupling arrangement can be made without departing form the spirit of the invention and scope of the appended claims.

I claim:

1. A connection assembly for use in one of an articulated coupling arrangement and a slackless drawbar assembly utilized in connecting together, in a substantially semi-permanent manner, adjacently disposed ends of a pair of railway cars, such one of an articulated coupling arrangement and a slackless drawbar assembly including at least one male connection member and at least one female connection member, said connection assembly comprising:

(a) a substantially spherical member having a predetermined diameter;

(b) a male connection member having an end, said end having an aperture formed therein having a predetermined configuration so as to form an inner surface within said male connection member;

(c) a retainer member engageable with at least a portion of said inner surface of said male connection member, said retainer member and said at least a portion of said inner surface of said male connection member cooperating together so as to form a substantially spherical inner surface capable of retaining said substantially spherical member therein, said spherical inner surface formed by at least a portion of said inner surface of said male connection member and at least a portion of said retainer member enabling movement of such male connection member in relation to such female connection member in both a vertical direction and a horizontal direction over a predetermined range of angles;

(d) a securing means for securing said retainer member within at least a portion of said inner surface of said male connection member; and (e) a joining means for joining said spherical member to such female connection member so as to facilitate connection of adjacent ends of such pair of railway vehicles.

2. A connection assembly as recited in claim 1 wherein said retainer member is a one piece member.

3. A connection assembly as recited in claim 1 wherein said retainer member is a substantially triangular member having at least one arcuate surface.

4. A connection assembly as recited in claim 1 wherein a slotted portion is formed along said inner surface of said male connection member and said retainer member has a shape in which at least a portion thereof is capable of being fitted within said slotted portion.

5. A connection assembly as recited in claim 4 wherein said slotted portion is formed by one of machining said inner surface of such male connection member and casting such male connection member to shape.

6. A connection assembly as recited in claim 4 wherein said slotted portion extends longitudinally along said inner surface of said male connection member to form a continuously extending single ledge.

7. A connection assembly as recited in claim 6 wherein said retainer member is a one piece circular member which is engageable with said continuously extending single ledge.

8. A connection assembly as recited in claim 4 wherein said spherical member includes a bore formed therethrough and said pair of shaft members are formed by a pin member extending through said bore.

9. A connection assembly as recited in claim 1 wherein said retainer member is formed from a metal material.

10. A connection assembly as recited in claim 1 wherein said retainer member is formed from a polymeric or composite material.

11. A connection assembly as recited in claim 9 wherein said retainer member is formed by filament winding resin impregnated fibers around a polymeric composite mesh material.

12. A connection assembly as recited in claim 1 wherein said securing means for securing said retainer member within said slotted portion of said male connection member is one of a bonding, brazing, welding, fusing and mechanical securing means.

13. A connection assembly as recited in claim 12 wherein said securing means includes a circular ring for mechanically securing said retainer member within said aperture of said male connection member.

14. A connection assembly as recited in claim 1 wherein said substantially spherical inner surface formed by said male connection member having said retainer member positioned therein has a substantially identical radius as a radius of said spherical member.

15. A connection assembly as recited in claim 1 wherein said substantially spherical inner surface formed by said male connection member having said retainer member positioned therein is slightly larger than a radius of said spherical member, and said connection assembly further includes a lubricating liner member disposed intermediate said substantially spherical inner surface and said spherical member.

16. A connection assembly as recited in claim 15 wherein said lubricating liner member is bonded to said substantially spherical inner surface formed by said male member and said retainer member.

17. A connection assembly as recited in claim 1 wherein said joining means for joining said spherical member to such female connection member includes a pair of shaft members extending outwardly a predetermined length from axially-opposed surfaces of said spherical member, a longitudinal axis of said pair of shaft members being in a substantially horizontal plane, one of said pair of shaft members being engageable with a respective one of an opening formed through each of a pair of upstanding side wall portions of a cavity formed in one end of such female connection member, at least a first portion of each of said pair of shaft members having a substantially identical configuration as at least a portion of a predetermined configuration of such opening formed through such side wall portions of such cavity, at least a second portion of each of said pair of shaft members having a substantially flat surface area to be engaged by a wedge member to secure said pair of shaft members to such female connection member.

18. A connection assembly as recited in claim 17 wherein said spherical member and said pair of shaft members forming a portion of said connection assembly are formed as a single piece.

19. A connection assembly as recited in claim 17 wherein said movement of such male connection member with respect to such female connection member over a range of predetermined angles is measured from a centerline of said spherical member disposed in a vertical direction, and from a longitudinal axis of such one of such articulated coupling arrangement and slackless drawbar assembly disposed in a horizontal direction.

20. A male connection member for use in one of an articulated coupling arrangement and a slackless drawbar assembly utilized in connecting together, in a substantially semi-permanent manner, adjacently disposed ends of a pair of railway cars, said male connection member comprising:
 (a) a first end engageable with one of an end of a first railway car and a drawbar connection means;
 (b) a second end remote from said first end, said second end having an aperture therein so as to form an inner surface within said male connection member, at least a first portion of said inner surface having an arcuate surface capable of receiving a first portion of a spherical member therein;
 (c) a second portion of said inner surface of said male connection member capable of receiving a retainer member therein, at least a portion of said retainer member including an arcuate surface for contacting a second portion of such spherical member, said first portion of said inner portion of said male connection member and retainer member cooperating together so as to secure such spherical member within said male connection member and provide a substantially spherical inner surface upon which such spherical member can rotate.

21. A male connection member as recited in claim 20 including joining means for joining such spherical member to a female connection member, said female connection member being engageable with an end of an adjacently disposed second railway car so as to connect said adjacently disposed second railway car with said male connection member and to facilitate connection of such second railway car with such adjacently disposed first railway car in a semi-permanent manner.

22. A male connection member as recited in claim 20 wherein said second portion includes a slotted portion formed within said inner surface of said male connection member.

23. A male connection member as recited in claim 22 wherein said slotted portion is formed by one of machining said inner surface of such male connection member and casting such male connection member to shape.

24. A male connection member as recited in claim 22 wherein said slotted portion extends longitudinally along said inner surface of said male connection member to form a continuously extending single ledge.

25. A male connection member as recited in claim 24 wherein said continuously extending single ledge is capable of having a one piece circular retainer engageable therewith.

26. A male connection member as recited in claim 22 wherein said male connection member is capable of movement with respect to such female connection member over a range of predetermined angles measured from a centerline of such spherical member disposed in a vertical direction, and from a longitudinal axis of one of such articulated coupling arrangement and slackless drawbar assembly disposed in a horizontal direction.

27. A male connection member as recited in claim 20 wherein securing means are provided for securing such retainer member within said slotted portion of said male connection member.

28. A male connection member as recited in claim 20 wherein said securing means is one of a bonding, brazing, welding, fusing and mechanical securing means.

29. A male connection member as recited in claim 20 wherein said substantially spherical inner surface formed by said male connection member having said retainer member positioned therein has a substantially identical radius as a radius of such spherical member.

30. A male connection member as recited in claim 20 wherein said substantially spherical inner surface formed by said male connection member having said retainer member positioned therein is slightly larger than a radius of such spherical member, and male connection member further includes a lubricating liner member disposed intermediate said substantially spherical inner surface and such spherical member.

31. A male connection member as recited in claim 30 wherein said lubricating liner member is bonded to said substantially spherical inner surface.

* * * * *